Jan. 10, 1939.   B. F. HALL   2,143,124
ELECTRICALLY DRIVEN ERASING MACHINE
Filed June 9, 1937
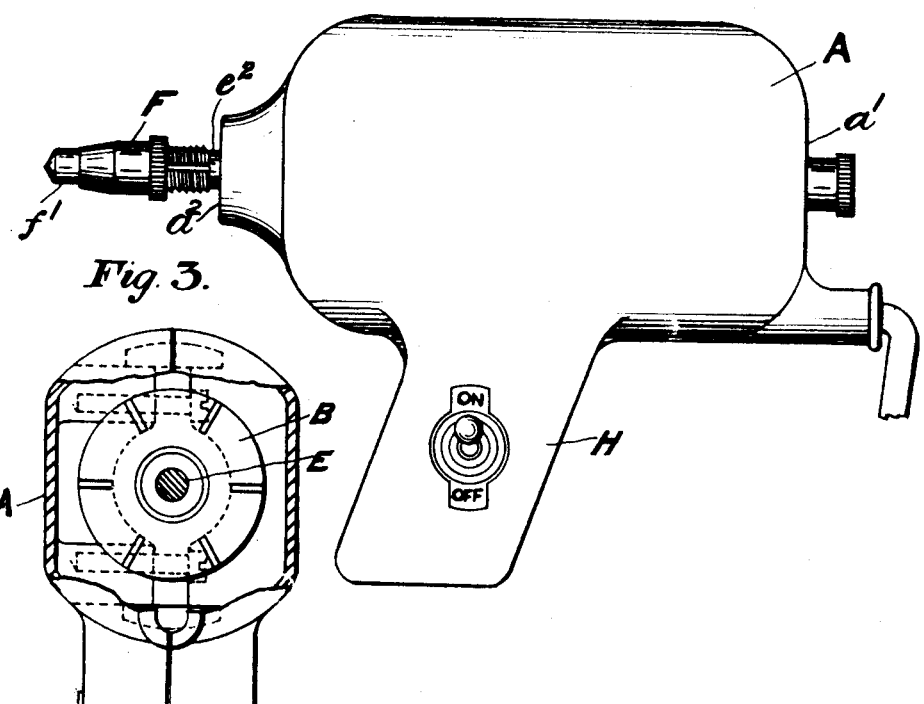
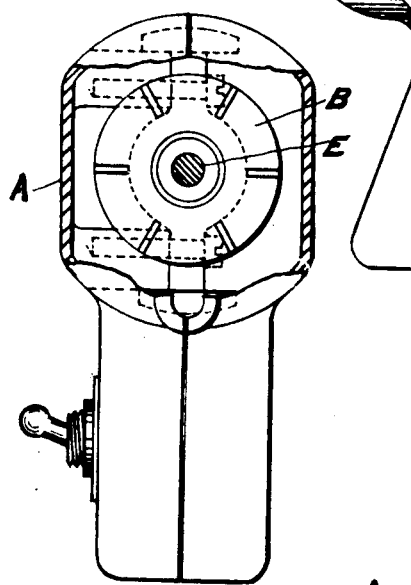
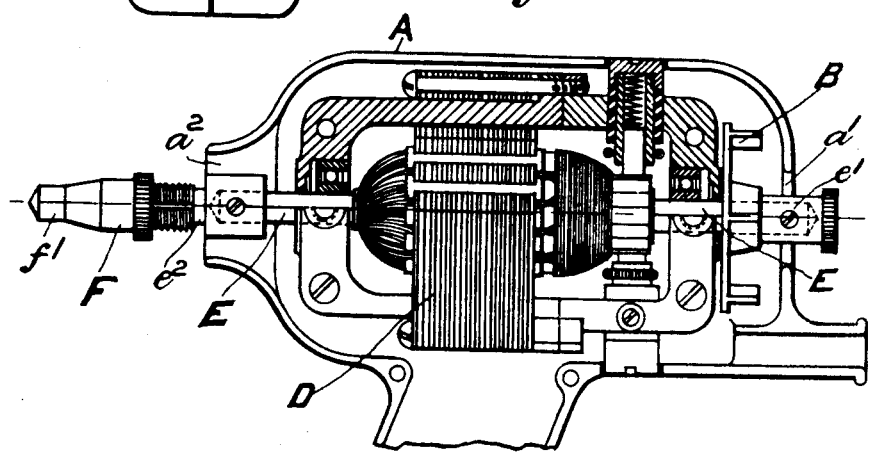
Inventor
Benjamin Fairfax Hall
By Eugene E. Stevens
Atty.

Patented Jan. 10, 1939

2,143,124

UNITED STATES PATENT OFFICE 2,143,124

ELECTRICALLY DRIVEN ERASING MACHINE

Benjamin Fairfax Hall, London, England

Application June 9, 1937, Serial No. 147,392
In Great Britain July 15, 1936

3 Claims. (Cl. 120—36)

This invention relates to erasing machines of the kind in which the erasing material is rapidly rotated by means of an electric motor, and has for its object to provide means whereby a current of air is caused to pass through the machine when in use so that the particles of the erasing medium and the erased particles are blown away, thus giving the operator a clear view of the matter to be erased, and at the same time preventing the temperature of the windings of the motor rising above satisfactory limits.

According to this invention, in the interior of the casing or body of the machine which is formed in two parts, I mount a fan co-axially on that end of the motor spindle opposite to the end which carries the erasing chuck. This end of the motor spindle may project through an opening in the end of the body or casing, such opening being sufficiently large to leave an annular space around the spindle to permit air to be sucked in therethrough by the fan. The opening in the opposite end of the casing or body through which the chuck, carrying the eraser, projects is also sufficiently large to permit the current of air drawn into the machine to be blown out through this opening.

The invention is illustrated on the accompanying drawing.

Fig. 1 is a side view of an electrically driven erasing machine constructed according to this invention.

Fig. 2 is a similar view with the one half of the casing or body removed showing the internal mechanism partly in section.

Fig. 3 is a part sectional rear end view of Fig. 1.

A represents the body or casing of the machine which is formed in two parts, B the fan, D the motor and E the spindle on which said fan B is mounted.

According to this invention I mount the fan B co-axially on the end $e^1$ of the spindle E, the eraser chuck F being fixed on the opposite end $e^2$ of said spindle. The end $e^1$ of the spindle projects through an opening in the casing A, such opening being sufficiently large to leave an annular space $a^1$ around the spindle E to permit air to be sucked into the machine by the fan B. The opening $a^2$ in the opposite end of the casing A through which the chuck F, carrying the eraser $f^1$, projects is also sufficiently large to permit the current of air drawn through the opening $a^1$ into the machine to be blown out through said opening $a^2$ at and axially along the periphery of the chuck and eraser.

When the machine is in operation as air is sucked in by the fan B it passes through the machine around the windings of the motor D and out through the annular space $a^2$ around and along the chuck F, thereby preventing the particles from the eraser $f^1$ and the particles erased from accumulating, consequently permitting the operator a clear view of the matter to be erased. Further, as the air passes over the windings of the motor D it prevents the temperature of such windings rising above a satisfactory limit.

A handle H, preferably formed on each half of the body or casing A where they join, is provided for holding the machine when being operated.

If found necessary, I may provide holes in the end of the casing A surrounding the chuck F to assist the passage of air issuing through the annular space $a^2$ around said chuck.

What I claim as my invention and desire to secure by Letters Patent is:—

1. An electrically driven erasing machine having an eraser chuck, air pump means located at the rear of the machine, and means for directing a current of air therefrom through the machine and axially along and around the periphery of the eraser chuck.

2. An electrically driven erasing machine having a casing and a motor, a fan mounted co-axially on the rear end of the motor spindle in the interior of the casing, an opening in the rear of said casing through which said end of the spindle projects, said opening being sufficiently large to leave an annular space around said projecting end of the spindle to permit air to be sucked therethrough by said fan, the other end of the motor spindle projecting through the casing and carrying an eraser chuck, and an annular space around the opening in the casing through which the chuck carrying spindle end projects sufficiently large to permit the current of air drawn into the machine to be blown out through said opening.

3. An erasing machine comprising a casing, an electrical motor therein and having a spindle projecting through the casing ends, an eraser carrying chuck on one end of the spindle externally of the casing, and a fan fixed on said spindle at the opposite end of the casing, said fan end of the casing being apertured for entry of air blown by the fan through the casing over said motor, and said casing at the chuck end being axially apertured in a manner to direct air from the fan axially along and over the periphery of said chuck.

BENJAMIN FAIRFAX HALL.